(12) United States Patent
Bowling et al.

(10) Patent No.: US 8,670,920 B2
(45) Date of Patent: Mar. 11, 2014

(54) UEGO SENSOR AIR-FUEL RATIO DETERMINATION SYSTEM AND METHOD

(75) Inventors: Bruce A. Bowling, Havre de Grace, MD (US); Albert C. Grippo, Virginia Beach, VA (US)

(73) Assignee: BG Soflex, LLC, Virginia Beach, VA (US)

( * ) Notice: Subject to any disclaimer, the term of this patent is extended or adjusted under 35 U.S.C. 154(b) by 555 days.

(21) Appl. No.: 13/039,658

(22) Filed: Mar. 3, 2011

(65) Prior Publication Data

US 2011/0218726 A1 Sep. 8, 2011

Related U.S. Application Data

(60) Provisional application No. 61/310,576, filed on Mar. 4, 2010.

(51) Int. Cl.
*B60T 7/12* (2006.01)
*G06D 1/00* (2006.01)
*G06F 7/00* (2006.01)
*G06F 17/00* (2006.01)
*F02D 41/14* (2006.01)

(52) U.S. Cl.
USPC ............ 701/109; 701/103; 123/672; 123/695

(58) Field of Classification Search
USPC ......... 123/672, 673, 674, 693, 695, 703, 304; 701/103, 109; 60/276; 73/23.32, 73/114.71, 114.72, 114.73
See application file for complete search history.

(56) References Cited

U.S. PATENT DOCUMENTS

| | | | | |
|---|---|---|---|---|
| 3,938,075 | A * | 2/1976 | Reddy | 340/438 |
| 7,707,821 | B1 * | 5/2010 | Legare | 60/277 |
| 7,886,523 | B1 * | 2/2011 | Legare | 60/285 |
| 2004/0144079 | A1 * | 7/2004 | Nagai et al. | 60/276 |
| 2007/0089402 | A1 * | 4/2007 | Bruck | 60/285 |

* cited by examiner

*Primary Examiner* — Willis R. Wolfe, Jr.
*Assistant Examiner* — Anthony L Bacon
(74) *Attorney, Agent, or Firm* — Procopio, Cory, Hargreaves & Savitch LLP (57) ABSTRACT

A method of determining an air-fuel ratio of an internal combustion engine in real-time includes: calibrating sensitivity of a universal exhaust gas oxygen sensor to a plurality of gases; inputting to a universal exhaust gas oxygen sensor controller a molecular composition of Hydrogen, Carbon, Oxygen, and Nitrogen which comprise a combustion fuel in use in the internal combustion engine; calculating with the universal exhaust gas oxygen sensor controller an air-to-fuel ratio by performing a chemical balance equation calculation based on the universal exhaust gas oxygen sensor sensitivity calibration and the input combustion fuel molecular composition; and transmitting the calculated air-to-fuel ratio to an engine control unit in real-time.

29 Claims, 4 Drawing Sheets

UEGO SENSOR AIR-FUEL RATIO DETERMINATION SYSTEM AND METHOD

CROSS-REFERENCE TO RELATED APPLICATIONS

This application claims the benefit of U.S. Provisional Application No. 61/310,576 filed Mar. 4, 2010. The entire disclosure of U.S. Provisional Application No. 61/310,576 is incorporated herein by reference.

BACKGROUND

1. Field

Systems and methods consistent with the present invention relate to determining air/fuel mass ratio for internal combustion engines, and more particularly to determining air/fuel mass ratio based on current sensed from an engine exhaust gas oxygen sensor.

2. Description of the Related Art

The need for increased control of internal combustion (IC) engines has been an ever-present requirement over the evolution if the IC engine. Over the years, control systems targeted to IC engines have become more sophisticated and complex in order to meet the needs of ever-increasing environmental and operational constraints. One such area of focus relates to maintaining an accurate air/fuel mass ratio (AFR) over all engine operational regions. The AFR is initially determined by measuring incoming air to the engine by a mass air flow sensor or by an intake manifold pressure sensor. The incoming air measurement is then converted to an air flow using the Ideal Gas Law. A precise amount of fuel is added to the air based on the known fuel injector flow rate to achieve the desired AFR. The air-fuel charge is then combusted in the engine and exhausted.

However, there are inaccuracies in the actual AFR that may arise from many sources, and can change during the life of the engine. For example, the airflow sensor can change characteristics due to dirt accumulation, injectors can acquire a varnish coating that changes the actual fuel flow rate, injector spring response can degrade, and fuel characteristics and humidity can vary. Hence, there is a need to obtain an independent measurement of the actual AFR, this measurement being used in a feedback loop that adjusts the injected fuel to more exactly achieve the AFR which is optimal for the engine conditions at hand.

This independent measurement is made after the mix is combusted using an exhaust gas oxygen sensor. These sensors can be of two types: Narrowband (NB) or Wideband (WB). An NB oxygen sensor simply determines if the exhaust gas is lean (excess oxygen) or rich (all oxygen is bound to another element). It provides a voltage that is sent directly to an engine control unit (ECU) which then adjusts fuel to maintain a stoichiometric ratio. This voltage from the NB sensor indicates that all free oxygen in the exhaust has been consumed and there is no excess CO or $H_2$.

A WB oxygen sensor, also known as a universal exhaust gas oxygen (UEGO) sensor, provides a measure of the degree of richness and leanness of the air/fuel ratio. This type of WB sensor provides an increased sensor signal bandwidth to the ECU in order to maintain stoichiometric operation and optimum catalyst efficiency. In motorsports applications, the UEGO sensor signal provides a direct feedback on the air/fuel ratio (AFR) which can be tailored for a desired mixture.

Another important use of the UEGO sensor signal is to accommodate different fuel mixes. Until recently, the vast majority of passenger cars have used only gasoline as a fuel. However, with fossil fuel resources being depleted, many alternative fuels are being pressed into service. These fuels include the 10% ethanol/90% gasoline mix now commonly sold at most filling stations, and an 85% ethanol mix (E85) that is also becoming popular. These fuels result in a significantly different AFR, both on and off the stoichiometric point. For example pure ethanol has a stoichiometric AFR of 9.0, while the stoichiometric AFR for regular gasoline is 14.7. It is for this reason that OEMs introduced special Flex-Fuel sensors in the fuel delivery system to provide a signal indicating the percentage gas/alcohol mix. Later model automobiles use UEGO signals directly in order to determine fuel composition mixture in so-called virtual-sensor arrangements.

In motorsport applications the use of alternative fuels is very prevalent—hydrocarbons such as diesel, ethanol, and nitro-methane are common. Oxidizers such as nitrous oxide are also very common. Additionally, water injection is used to reduce the tendency of detonation in boost applications. And all of the above can be combined all at once in various proportions depending on operating situation. The effect combining fuels is an altering of the final hydrocarbon and oxygen/nitrogen the engine ultimately has to ignite for combustion. And since this fuel combination determines the exhaust gas species molar concentration, and hence UEGO sensor pump current (to maintain Nernst cell stoichiometry within the sensor head), it is important to take the fuel composition into account. Expensive, lab-grade UEGO sensor calibration meters allow the entry of hydrocarbon H/C and O/C ratios and humidity/vapor pressure, but these are fixed quantities and not adjustable in real-time. Lower-cost UEGO sensor controllers do not offer any adjustment in fuel composition, assuming a fixed H/C and O/C fuel for all conditions.

Existing aftermarket wideband UEGO controllers do not have provisions for alternative hydrocarbon fuels or additional sources of oxidizers such as $N_2O$. While the lambda value i.e., the normalized air/fuel ration relative to the stoichiometric point is a fair approximation for many fuels, it is not exact because the sensitivities of the UEGO sensor to CO and $H_2$ have not been taken into account on the rich side of the stoichiometric point, and the error grows as the AFR departs from stoichiometric on both the lean side and even more on the rich side.

Also, the lambda value is generally less intuitive to users of the WB controller for motorsport applications, who are more familiar with the AFR value. While the lambda value can be converted to an AFR, it requires the user to input the stoichiometric AFR for the fuel being used. While this can easily be done for pure fuels such as pure gasoline and ethanol, it needs to be calculated for fuel/oxidizer mixes. For varying mixes, for example, when a user has a partial tank of gasoline and fills up with E85, calculation of the stoichiometric AFR becomes even more problematic. Existing aftermarket UEGO sensor controllers do not address this problem, nor do they allow the entry/implementation of real-time hydrocarbon/oxidizer/$H_2O$ mixtures.

Another limiting aspect with current UEGO sensor controllers available is the lack of UEGO sensor calibration. The controllers only allow, at best, calibration in free air, assuming an $O_2$ content of 20.9% and extrapolating this value for both lean and rich lambda calculation. Other UEGO sensor controllers use a fixed published lambda-vs-pump current transfer function, valid only for a predetermined gas combination and UEGO sensor. Free-air calibration will yield a satisfactory calibration for lean side of stoichiometric (i.e., excess oxygen, lambda >1), however rich-side operation is not sufficiently calibrated. In fuel-rich combustion where all oxygen is consumed there are many gas species remaining, including CO, $H_2$ and unburned HC. The UEGO sensor operates by reducing the CO and $H_2$ into $CO_2$ and $H_2O$ (i.e., $CO+O_2 \rightarrow 2CO_2$ and $H_2+O_2 \rightarrow 2H_2O$).

It is apparent that a calibration utilizing oxygen-only will not adequately determine $H_2$ and CO sensor sensitivities. It should be noted that in motorsports applications, fuel-rich operation is often desirable since optimum engine torque output often occurs at regions around lambda=0.9. In this case, maintaining stoichiometric operation is not a requirement.

Finally, the actual determination of lambda and AFR from UEGO pump current readings is not well-defined in aftermarket controllers. As stated earlier, many controllers utilize default pump current vs. lambda values from sensor-head manufacturer data. Of course, the real world requires the use of sensor calibration along with knowledge of the hydrocarbon under combustion—both are required for accurate AFR and lambda determination.

Sensor-head calibration is easily accomplished by bench-testing UEGO sensors with known gas compositions, namely $O_2$, CO and $H_2$. It should be noted that although the UEGO sensor is also sensitive to unburned hydrocarbons, the amount of such constituents in the exhaust of a modern engine operating under normal operating conditions is in the parts-per-million range, whereas the concentrations of CO and $H_2$ are orders of magnitude higher.

The proper way to determine lambda and AFR from a known hydrocarbon fuel is by chemical balance equations. In simple terms, the balance equation keeps track of the moles (or concentrations or partial pressures) of each gas species before and after combustion—nothing is lost and all components have to be accounted for. This calculation can be complicated, and has been the topic of several technical papers. Most are targeted for situations where each specific gas component is individually measured, as is the case with 4 and 5-gas bench analyzers.

For instance a method of calculating lambda value is described in the paper of J. Brettschneider, "Calculation of the air ratio of air-fuel mixtures and the influence of measurement errors on lambda" in Bosch Technische Berichte, Bd. 6, Heft 4 (1979), pp. 177 to 186. The Brettschneider calculation has become the standard for lambda calculation in multi-gas analyzers, although there are comparable calculations presented in the literature by Silva, Spindt, and Simons. The approaches outlined in each of these papers have the luxury of separate and independent measurement of each of the gas constituents. In other words, there are separate sensor elements which are sensitive to gas components O2, CO, etc. In a UEGO sensor, on the other hand, there is one sensor element that is responsive to multiple gas components, and hence one measurement. In algebraic terms, there are multiple equations (chemical balance equations) with unknowns, but only one measurement. Hence, relations that yield more information from the one measurement source are needed. These relations come from the knowledge of the hydrocarbon under combustion and the UEGO sensor element sensitivities to specific gas constituents.

Simplifications have been suggested to reduce the computational burden in order to provide real-time updates, generally in the form of scaling fixed response curves or transfer functions obtained in the most general case. This leads to a simplified lambda calculation for fuel-rich combustion and works sufficiently well when the hydrocarbon is fixed, as is the case in a production engine. However, when the fuel types and proportions change, the sensitivities become important and influence the calculation directly.

SUMMARY

One or more exemplary embodiments provide a method and system for determining air/fuel mass ratio.

According to an aspect of an exemplary embodiment, there is provided a method for determining air/fuel mass ratio based on current sensed from an engine exhaust gas oxygen sensor. The method may include calibrating sensitivity of a universal exhaust gas oxygen sensor to a plurality of gases; inputting to a universal exhaust gas oxygen sensor controller a molecular composition of Hydrogen, Carbon, Oxygen, and Nitrogen which comprise a combustion fuel in use in the internal combustion engine; calculating with the universal exhaust gas oxygen sensor controller an air-to-fuel ratio by performing a chemical balance equation calculation based on the universal exhaust gas oxygen sensor sensitivity calibration and the input combustion fuel molecular composition; and transmitting the calculated air-to-fuel ratio to an engine control unit in real-time.

The method may further include storing in a memory in the universal exhaust gas oxygen sensor controller calibration constants for the plurality of gases resulting from calibrating the sensitivity of the universal exhaust gas oxygen sensor.

The method may further include inputting the molecular composition of the combustion fuel to the universal exhaust gas oxygen sensor controller via a human interface device.

The method may further include inputting the molecular composition of the combustion fuel to the controller as an electrical signal from a sensor.

The sensor may be one of a humidity sensor, a Flex-Fuel composition sensor, and a nitrous oxide solenoid open sensor.

The electrical signal may be a digital signal or an analog signal.

The combustion fuel may be mixed fuel.

The molecular composition of the combustion fuel may be input in real-time by a sensor that senses proportions of mixed fuels.

The method may further include controlling one or more fuel injectors in real time with the engine control unit based on the transmitted air-to-fuel ratio to adjust fuel delivery to the internal combustion engine to maintain the air-to-fuel ratio.

The air-to-fuel ratio calculation may be performed using a molar balance calculation.

According to another aspect of an exemplary embodiment, there is provided a computer-readable recording medium storing a computer-readable program for executing the method.

According to another aspect of an exemplary embodiment, there is provided a system or determining an air-fuel ratio of an internal combustion engine in real-time. The system may include an engine control unit; a universal exhaust gas oxygen sensor mounted in an exhaust stream; and a universal exhaust gas oxygen sensor controller which receives a signal from the universal exhaust gas oxygen sensor and performs a chemical balance equation calculation to calculate air-to-fuel ratio in real-time based on the received signal.

The universal exhaust gas oxygen sensor controller may communicate the calculated air-to-fuel ratio to the engine control unit in real-time The engine control unit may provide real-time control of the internal combustion engine to maintain the air-to-fuel ratio communicated from the universal exhaust gas oxygen sensor controller.

The system may further include a human interface device which inputs universal exhaust gas oxygen sensor sensitivity calibration data for a plurality of gases to the universal exhaust gas oxygen sensor controller.

The system may further include a memory in the universal exhaust gas oxygen sensor controller in which the universal exhaust gas oxygen sensor sensitivity calibration data for the plurality of gases are stored.

The system may further include a human interface device which inputs a molecular composition of a combustion fuel in use to the universal exhaust gas oxygen sensor controller.

The molecular composition of the combustion fuel in use may include the molecular composition of Hydrogen, Carbon, Oxygen, and Nitrogen of the combustion fuel.

The system may further include a sensor which senses and inputs the molecular composition of the combustion fuel to the universal exhaust gas oxygen sensor controller as an electrical signal.

The sensor may be one of a humidity sensor, a Flex-Fuel composition sensor, and a nitrous oxide solenoid open sensor.

The system may further include a sensor that senses and inputs the molecular composition by proportions of mixed combustion fuels to the universal exhaust gas oxygen sensor in real-time.

The engine control unit may control one or more fuel injectors in real time based on the transmitted air-to-fuel ratio to adjust fuel delivery to the internal combustion engine to maintain the air-to-fuel ratio.

The air-to-fuel ratio calculation may be performed using a molar balance calculation.

BRIEF DESCRIPTION OF THE DRAWINGS

The above and other aspects and features of the present invention will be more apparent by describing exemplary embodiments of the present invention with reference to the accompanying drawings, in which.

DETAILED DESCRIPTION

Aspects of the present inventive concept provide a system and method that use a one-time calibration of the sensitivity of a UEGO sensor to the gases $O_2$, CO, and $H_2$ to directly calculate, in a UEGO sensor controller, an air/fuel ratio of an arbitrary air/fuel mix ingested by an IC engine. Factory calibration of the sensitivities of various UEGO sensors to the above three gases is performed, and the resulting calibration constants are stored in the UEGO sensor controller memory. Together with types and relative volumes/masses of the fuel mixes to be used, the calibration constants are sufficient to provide response information on a particular UEGO sensor. The types and relative volumes/masses of the fuel mixes may be entered as numerical values directly into the UEGO sensor controller using a human interface device (HID) or may be provided through an electrical signal from a sensor. This electrical signal may be a simple digital signal denoting the addition of specific fuel components, or a more information-rich signal such as an analog voltage or pulse-coded digital signal.

The fuel composition alteration signal may be used to indicate to the UEGO sensor controller the required fuel mix, so that the calculated AFR will be correct. No special calibration is needed. Similarly, a humidity sensor may be used to signal the UEGO sensor controller as to the percentage $H_2O$ in the entering air mixture.

Further, in the racing community, an injection of nitrous oxide may be used to provide boost to a car during the race. Nitrous oxide injection can be indicated to the UEGO sensor controller by providing a signal that the nitrous oxide solenoid is open. This fuel can be factored into the mix, and again a correct AFR will be provided. A permanent change in fuel can also be made, for example from gasoline to propane or LPG. While this would require mechanical modifications to the engine, it would only require entering the type of the new fuel into the UEGO sensor controller to perform the AFR calculation.

Figure 1:
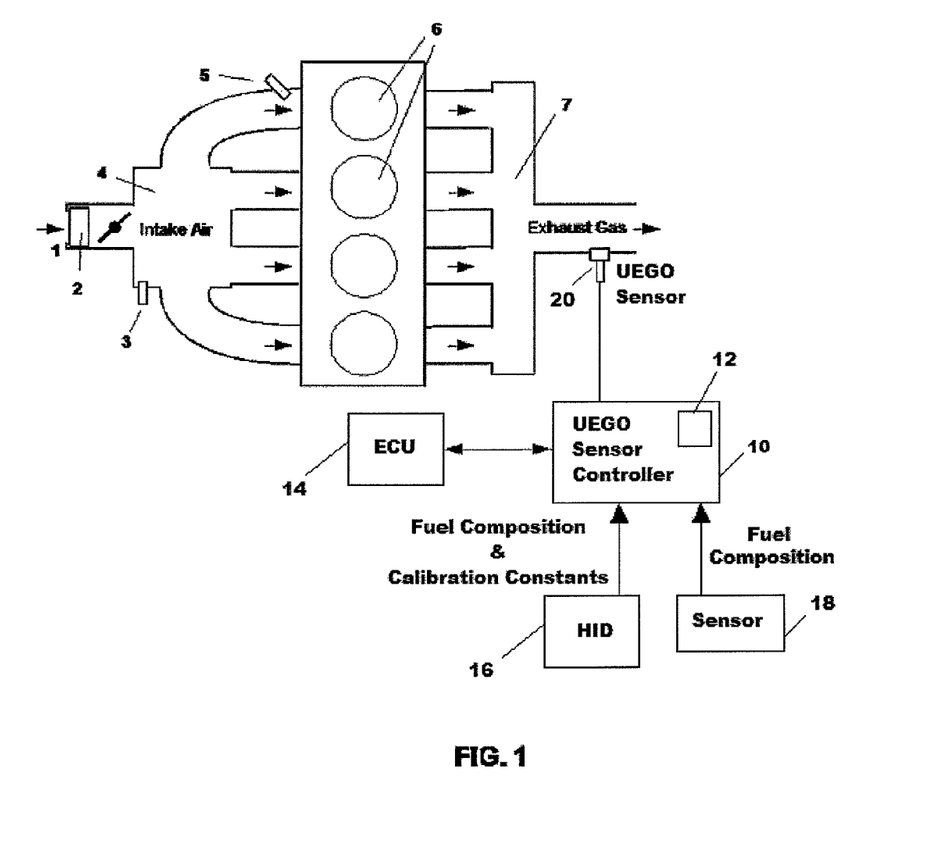
FIG. 1 is a schematic overview of an engine air induction and exhaust system according to an exemplary embodiment.

FIG. 1 is a schematic overview of an engine air induction and exhaust system according to an exemplary embodiment. Referring to FIG. 1, incoming air 1 to the engine intake manifold 4 is measured by a mass air flow sensor 2 or by an intake manifold pressure sensor 3. The incoming air measurement is then converted to an air flow using a calculation based on the Ideal Gas Law. An amount of fuel is injected into the incoming air to achieve the desired AFR. The air flow and fuel injection calculations are performed by an ECU 14 based on a known flow rate of fuel injector 5. The air-fuel charge is then combusted in the engine cylinders 6 and exhausted into the exhaust manifold 7. The molecular composition of the exhaust gas 8 is measured by a UEGO sensor 20 in conjunction with a wideband UEGO sensor controller 10.

Molecular composition information of the combustion fuel and calibration constants for the UEGO sensor 20 are input to the UEGO sensor controller 10 via a human interface device (HID) 16. The HID 16 may be, for example but not limited to, an external personal computer, smartphone, or personal data assistant which communicates with the UEGO sensor controller 10 using a digital or analog data interface. The HID 16 allows a user to directly input the calibration constants and/or molecular fuel composition, including multiple combined fuel sources, to the UEGO sensor controller 10.

Alternatively or additionally, molecular composition information of the combustion fuel may be input to the UEGO sensor controller 10 as an electrical signal from a sensor 18. The sensor 18 may be, for example but not limited to, a Flex-Fuel sensor, a humidity sensor, or other engine sensor.

Calibration constants of the UEGO sensor 20 are stored in the UEGO sensor controller memory 12. Based on the AFR determined from this measurement, a correction can be made to the fuel injection by the ECU 14 on the next engine fuel injector 5 cycle.

In an NB sensor, oxygen in the exhaust is measured by a "Nernst" cell. The operation of the NB sensor is such that its output is 0.45 volts when a balance has been achieved such that there is essentially no free oxygen in the exhaust, but essentially no unconsumed fuel either. As soon as the exhaust becomes the least bit rich or lean, the voltage very rapidly drops toward 0 or jumps toward 1 volt. This change occurs so quickly that a meaningful value for the degree of richness/leanness cannot be obtained. Thus, the NB oxygen sensor effectively provides only three discrete outputs: rich, stoichiometric, or lean.

Figure 2:
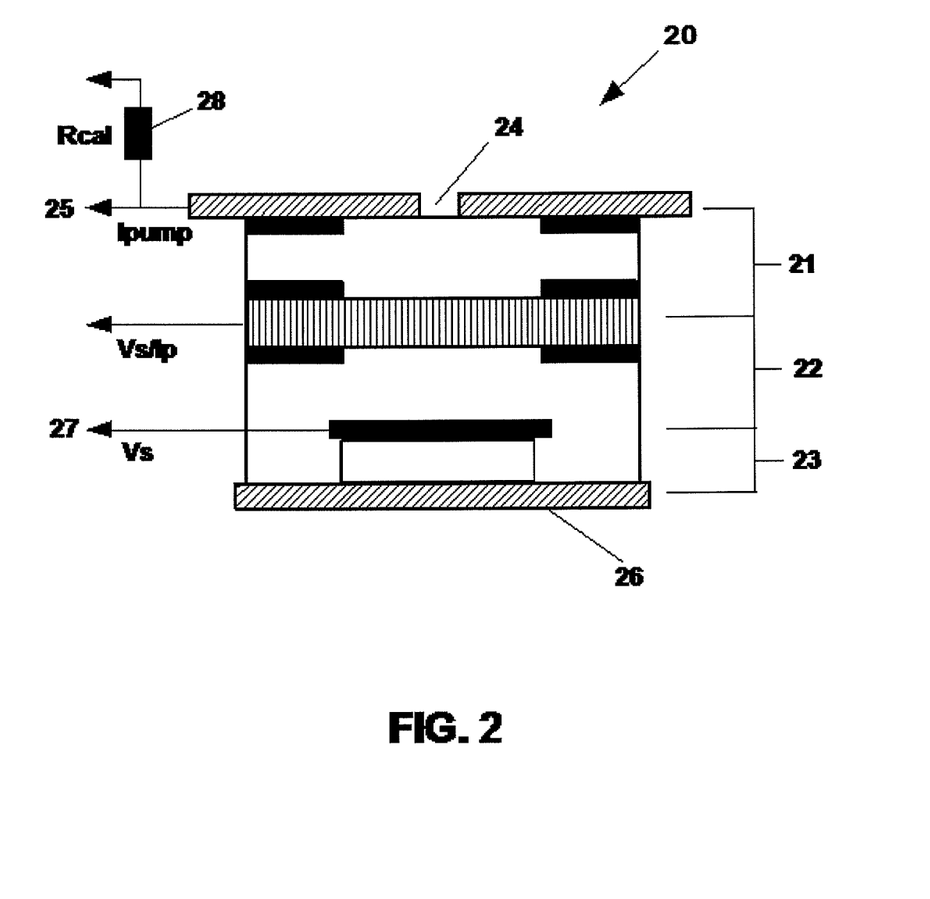
FIG. 2 is a sectional view of an exemplary universal wideband exhaust gas sensor.

FIG. 2 is a sectional view of an exemplary universal wideband exhaust gas sensor. Referring to FIG. 2, a typical UEGO sensor 20 combines an oxygen-sensing Nernst cell 22 with an "oxygen pump" 21, which is essentially a second Nernst cell, and a reference cell 23 which is exposed to air to create a device that gives a wide range response to various air/fuel ratios. The Nernst cell 22 senses exhaust gas oxygen in the same way as in a conventional NB oxygen sensor. However, the reference cell 23 and the oxygen pump cell 21 are connected in such a way that exhaust gas 8 passes through the diffusion gap 24 into the pump cell 21, and the pump cell 21 either pumps oxygen out of its cavity or pumps oxygen into its cavity so as to achieve a stoichiometric balance.

When the air/fuel mixture is rich, the reference cell 23 produces a high $V_s$ voltage 27 (above 0.450 volts). The UEGO sensor controller 10 (see FIG. 1) reacts to produce a pump current 25 in a "negative" direction to consume free fuel. When the air/fuel mixture is lean, the reference cell 23 produces a low $V_s$ voltage 27 (lower than 0.45 volts). The UEGO sensor controller 10 then produces a pump current 25 in the opposite ("positive") direction to consume free oxygen.

When the air/fuel mixture is at the stoichiometric point, the pump cell 21 requires no pump current 25. Since the free oxygen or free fuel has been neutralized, the $V_s$ voltage 27 feedback signal goes to about 0.45 volts (the stoichiometric reference value).

Measuring the pump current 25 flow and direction required to achieve this balance through a resistor $R_{cal}$ 28 allows the UEGO sensor controller 10 to determine the air/fuel ratio at which the engine is operating. A controlled heater element 26 ensures the UEGO sensor 20 is kept at a nominal operating temperature of 750° C. (~1400° F.), so that changes in the actual exhaust gas temperature do not become a factor in maintaining a balanced condition in the pump cell 21. The result is a UEGO sensor 20 that can measure lambda ratios (i.e., normalized air/fuel ratios relative to the stoichiometric point) from very rich (0.5) to extremely lean (1.5).

The above-described UEGO sensor 20 allows the UEGO sensor controller 10 to control the air/fuel mix entering the engine directly. Instead of switching the air/fuel mix back and forth from rich to lean to create an average balanced mixture, the UEGO sensor controller 10 can simply add or subtract the amount of fuel needed to maintain a stoichiometric lambda of 1.0 or any other ratio.

To provide this fuel, however, the controller 10 must provide the AFR to the ECU 14, since the AFR, along with the intake air mass (provided by a separate sensor), are needed to obtain the required fuel mass.

The calculations to be presented describe a method to obtain the AFR for arbitrary fuels and mixes of fuels from the measured pump current required to maintain a UEGO sensor Nernst cell at a fixed 0.45 volt potential during engine operation. The method only requires a calibration of the system sensitivities to $O_2$, CO and $H_2$ gases. Once this is calibration is done, the method may be employed in real-time to calculate the AFR of arbitrary fuels and mixes of fuels without any further calibration.

The exemplary embodiments are based on a balance and re-arrangement of the basic combustion equation: Fuel+Air→Combustion Products. Or, as described by equation (1):

$$\phi \cdot C_a H_b O_c N_d + (xo \cdot O_2 + xn \cdot N_2) \rightarrow v1 CO_2 + v2 H_2O + v3 N_2 + v4 O_2 + v5 CO + v6 H_2 \quad (1)$$

The subscripts a, b, c, and d are inputs describing the fuel composition; xo and xn are constants representing the air composition (0.2095 and 0.7905 for oxygen and nitrogen, respectively). The nitrogen can be considered lumped together with argon and other inert components in the air. The multiplier $\phi$ is the fuel mole fraction relative to a mole of air.

The fuel mole fraction, along with the fractions vi, which are also mole fractions relative to a mole of air, can be calculated by balancing the molecules in equation (1).

For the lean air/fuel mixture case in which there is excess oxygen, it can be assumed that v5=v6=0, because the excess oxygen prevents water-gas ($CO_2$) dissociation. The resulting equations (2), (3), (4), and (5) are:

$$\text{Carbon: } v1 = a\phi \quad (2)$$

$$\text{Hydrogen: } v2 = b\phi/2 \quad (3)$$

$$\text{Oxygen: } 2v1 + v2 + 2v4 = c\phi + 2xo \quad (4)$$

$$\text{Nitrogen: } v3 = d\phi/2 + xn \quad (5)$$

Combining equation (4) with equations (2) and (3) yields equation (4a):

$$v4 = xo - (a + b/4 - c/2)\phi \quad (4a)$$

The usual assumption made at this point is that the fuel/air molar ratio, $\phi$, is known, and hence the goal to find the component compositions is complete.

A sensor controller according to the exemplary embodiments calculates $\phi$ from the above equations plus the pump current, Ip, from the Nernst cell in a UEGO sensor. The pump current is used to maintain stoichiometric voltage within the cell by pumping oxygen in or out of the cell depending on the exhaust mixture. The stoichiometry problem is divided into a lean side and a rich side, determined by the pump current being greater than or equal to zero (i.e., a lean exhaust mixture wherein the current is used to pump free oxygen out of the cell to maintain a stoichiometric 0.45 volts) or pump current being less than zero (i.e., a rich exhaust mixture wherein current is used to pump oxygen into the cell). Equation (6) is an expression for the lean case:

$$Ip = KO_2 \cdot P(O_2) = KO_2 \cdot P_{tot} \cdot v4 / \Sigma vi \quad (6)$$

In equation (6), $KO_2$ is a calibration constant obtained from the UEGO sensor by running various concentrations of $O_2$ through the sensor and measuring the pump current, Ip, in milliamps, needed to maintain 0.45 V in the Nernst cell. The partial pressure of the oxygen, $P(O_2)$, is by definition equal to the total pressure, $P_{tot}$, in kPa, times the mole fraction of $O_2$. The latter is v4 divided by the sum of all the molar components:

$$\Sigma vi = x0 + xn + (b/4 + c/2 + d/2) \quad (6a)$$

Combining all of the above equations results in equation (7):

$$\varphi = \frac{xo - (IP/(KO_2 \cdot P_{tot}))}{(Ip/(KO_2 \cdot P_{tot})) \cdot (b/4 + c/2 + d/2) + (a + b/4 - c/2)} \quad (7)$$

From equation (7) the mass air/fuel ratio can be written directly as:

$$AFR = \frac{2xoMO + 2xnMN}{\varphi \cdot (aMC + bMH + cMO + dMN)}, \quad (8)$$

where MC, MH, MO and MN are the molecular weights of carbon C, hydrogen H, oxygen O, and atmospheric nitrogen $N_2$: 12.011, 1.008, 16, and 14.08, respectively. The final equation for the lean case is equation (8a):

$$AFR = 28.964/(\phi \cdot (12.011a + 1.008b + 16c + 14.08d)) \quad (8a)$$

At the stoichiometric point, Ip=0, since $O_2$ is neither pumped in or out of the Nernst cell. Hence, from equation (7) with Ip=0 and equation (8):

$$AFRStoich = \frac{28.964 \cdot (a + b/4 - c/2)}{xo \cdot (12.011a + 1.008b + 16c + 14.08d)} \quad (8b)$$

From these equations the air/fuel lambda ratio, $\lambda$, can be written as:

$$\lambda = AFR/AFRStoich = xo/(\phi \cdot (a + b/4 - c/2)) \quad (8c)$$

The rich case, indicated by Ip<0, is more complex mathematically because of the assumption that v4=0, that is, there is no excess oxygen. However, the basic equation (1) still holds and the balance equations result in:

Carbon: $v1+v5=a\phi$ (9)

Hydrogen: $2(v2+v6)=b\phi$ (10)

Oxygen: $2v1+v2+v5=c\phi+2xo$ (11)

Nitrogen: $v3=d\phi/2+xn$ (12)

Because there is an extra unknown, another equation is needed. This is the water balance equation obtained from the dissociation of $H_2O$ and $CO_2$ into $H_2$ and CO expressed by equation (13):

$$\frac{v2 \cdot v5}{v1 \cdot v6} = Kp, \quad (13)$$

where Kp is the equilibrium constant, a function of exhaust temperature. For a typical value of 1740 K, Kp is 3.5.

The measured sensor current for the rich case is given by equation 14:

$$Ip = -KCO \cdot P(CO) - KH_2 \cdot P(H_2) = -(P_{tot}/\Sigma vi) \cdot (KCOv5 + KH_2v6), \quad (14)$$

which includes two additional sensitivity calibrations, KCO and $KH_2$. Substituting in the component expressions from equations (9) to (12), yields equation (15):

$$\Sigma vi = xn + (a+b/2+d/2)\phi \quad (15)$$

Also, from equations (9) to (11), v1, v2, and v6 can be written in terms of v5 and $\phi$ as follows:
From equation (9), $v1 = a\phi - v5$.
From equation (11), $v2 = c\phi + 2xo - 2v1 - v5 = c\phi + 2xo - 2a\phi + v5$.
From equation (10), $v6 = (b\phi/2) - v2 = (b\phi/2) - c\phi - 2xo + 2a\phi - v5$.

Inserting v6 and equation (15) into equation (14) and solving for the unknown component, v5, equation (16) can be written as:

$$v5 = -[((xnIp/P_{tot}) - 2xoKH_2)/(KCO - KH_2)] - [((Ip/P_{tot}) \cdot (a+b/2+d/2) + KH_2(2a+b/2-c))/(KCO-KH_2)] \cdot \phi = C51 + C52 \cdot \phi, \quad (16)$$

where C51 and C52 are convenience terms of known or measured quantities:

$$C51 = -[((xnIp/P_{tot}) - 2xoKH_2)/(KCO - KH_2)] \quad (16a)$$

$$C52 = -[((Ip/P_{tot}) \cdot (a+b/2+d/2) + KH_2 \cdot (2a+b/2-c))/(KCO - KH_2)] \quad (16b)$$

The four terms on the left side of the water balance equation (13) are now in terms of $\phi$. Cross multiplying, quadratic equation (17) is obtained:

$$A\phi^2 + B\phi + C = 0, \quad (17)$$

where A, B, and C are defined as:

$$A = [-Kp(a-C52) \cdot (C52 - (2a+b/2-c)) + C52 \cdot ((2a-c) - C52)] \quad (17a)$$

$$B = \{Kp[C51 \cdot (C52 - (2a+b/2-c)) - (2xo+C51) \cdot (a-C52)] + C51 \cdot ((2a-c) - C52) - C52 \cdot (2xo+C51)\} \quad (17b)$$

$$C = C51 \cdot (2xo+C51) \cdot (Kp-1) \quad (17c)$$

The sign of the radical in the solution of equation (17) is taken to make $\phi$ come out positive. The case $KCO = KH_2$ typically does not occur in practice because the sensitivities to CO and $H_2$ are quite different. In any case, the $KCO = KH_2$ equality simplifies equation (16) and $\phi$ can be solved for directly. The AFR and lambda ratio, $\lambda$, are then obtained from equations (8a) to (8c) which apply to the rich case as well.

Exemplary embodiments provide the capability of working with several different concurrent fuel sources in combination For example, given a mix of fuels by percent weight, each fuel may be represented as $W_i$ with composition $C_{ai}H_{bi}O_{ci}N_{di}$, where the $W_i$ add up to 100%. Such a mixture can be represented as a single fuel of the form: $C_aH_bO_cN_d$, as follows.

The molecular weights of the fuels can be written as:

$$Mi = aiMC + biMH + ciMO + diMN, \quad (18)$$

MC, MH, MO and MN again being the molecular weights of carbon C, hydrogen H, oxygen O, and atmospheric nitrogen $N_2$: 12.011, 1.008, 16, and 14.08, respectively. The mixed fuel molecular composition is then:

$$a = \Sigma[(W_i \cdot ai)/M_i], \quad (19a)$$

$$b = \Sigma[(W_i \cdot bi)/M_i], \quad (19b)$$

$$c = \Sigma[(W_i \cdot ci)/M_i], \quad (19c)$$

$$d = \Sigma[(W_i \cdot di)/M_i], \quad (19d)$$

the sums being over all the fuel types in the mix. $W_i$ can remain as a percentage because it is an appropriate scaling, and the relative numbers of the elements are of more importance. The carbon ratios for the fuel elements can be obtained by dividing b, c, and d by a, and setting a equal to 1. Thus, $C_aH_bO_cN_d$ is equivalent to $CH_{b/a}O_{c/a}N_{d/a}$ and the subscripts are termed the H/C, O/C and N/C ratios.

If the mixture is specified by fuel volumes $V_i$ with densities $\rho_i$, then the weight fractions can be calculated as shown by equation 20:

$$W_i/100 = mass_i/\Sigma(mass_i) = \rho_i \cdot V_i/\Sigma(\rho_i \cdot V_i) \quad (20)$$

and the preceding equations used.

Various "fuels" can be specified, such as water ($H_2O$) in the form of humidity or deliberate water injection, and Nitrous Oxide ($N_2O$), by setting ai=0 and bi or di=0 as appropriate. It can easily be seen that the method can accommodate practically any mass combination of fuel and oxidizer. As long as the composition mass of each component is known and presented to the UEGO sensor controller at the time of combustion, an accurate ratio of air to fuel can be determined in real-time.

Also, experimental engine setups are known which utilize oxygen ($O_2$) gas sources that are introduced to the engine in addition to the incoming intake air to act as an enhanced oxidizer. With the exemplary embodiments, it is possible to account for the addition of extra oxygen. Referring back to equation (1), the incoming air ratio of oxygen (xo) and nitrogen (xn) can be altered to account for the extra oxygen—the sum of xo and xn is equal to one so additional $O_2$ will have the effect of reducing the content of $N_2$.

Figure 3:
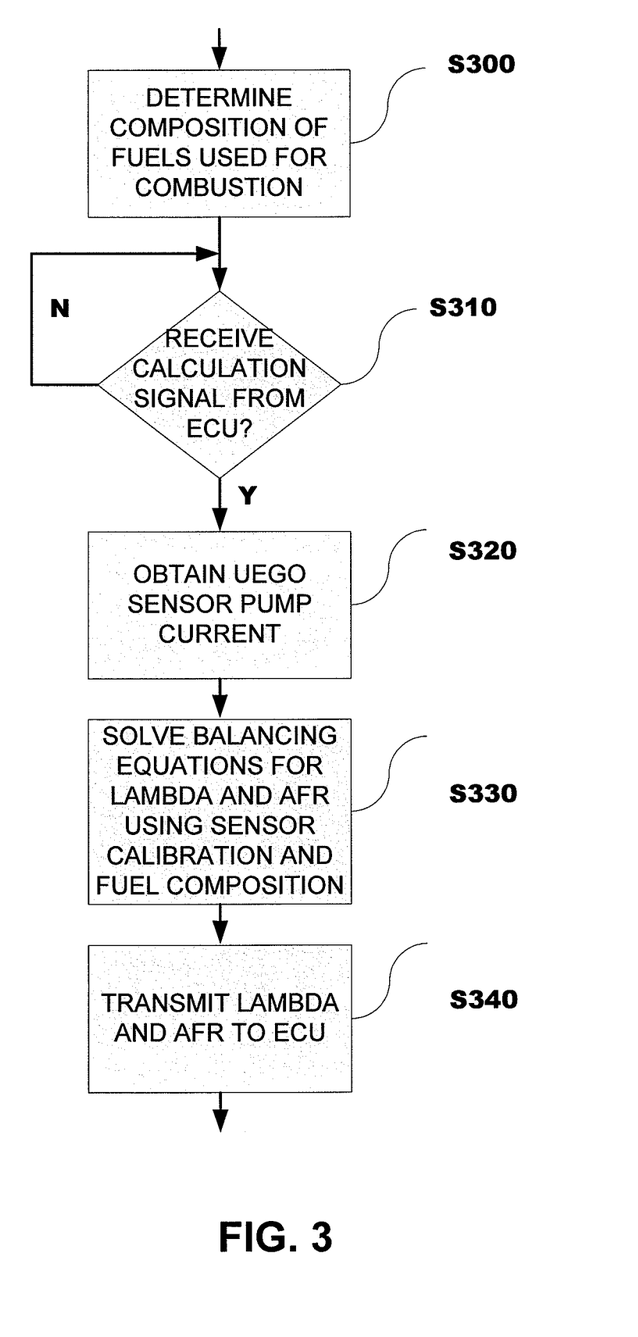
FIG. 3 is a flow chart illustrating a method according to an exemplary embodiment.

FIG. 3 is a flow chart illustrating a method according to an exemplary embodiment. The method uses the sensed pump current from a UEGO sensor to calculate AFR for arbitrary fuels and mixes of fuels which may be used for internal combustion engines. The sensing and control of the pump current and the calculation of AFR are done in a UEGO sensor controller, which may be separate from, or a part of an ECU.

Referring to FIG. 3, the fuel composition is first determined (S300). The fuel composition may be determined either from fixed inputs, which could be constant and hence only a one time calculation would be needed, or from sensor read backs from, for example but not limited to, flex-fuel sensors, or water injectors, or nitrous oxide injectors, that provide the percentage composition of the fuel mixture. The UEGO sensor controller 10 waits for the ECU 14 to transmit a signal instructing the UEGO sensor controller 10 to begin calculation of the AFR(S310-N). The signal may be sent because fuel injection is needed or it may be sent at a periodic rate independent of engine cylinder events. Upon receiving the calculate signal from the ECU 14 (S310-Y), the UEGO sensor controller 10 obtains UEGO sensor pump current 25 (S320). In the background, the UEGO sensor pump current 25 is continuously adjusted by the UEGO sensor controller 10, and the UEGO sensor pump current 25 value is read by the UEGO sensor controller 10 at this time. The equations described above are then solved for the AFR and lambda values (S330). The AFR and lambda values thus obtained are then transmitted to the ECU 14 for correction of the fuel mass on the next scheduled injection.

In another exemplary embodiment, the method may be embodied on a computer readable medium as a program for causing, when executed, hardware, for example but not limited to, a computer, a processor, a Field-Programmable Gate Array (FPGA), or an Application-Specific Integrated Circuit (ASIC) to execute the operations of the method. The computer readable medium may be, for example but not limited to, magnetic storage media, optical storage media, and solid state storage media, for example but not limited to, flash memory, volatile memory, non-volatile memory, and programmable memory.

Figure 4:
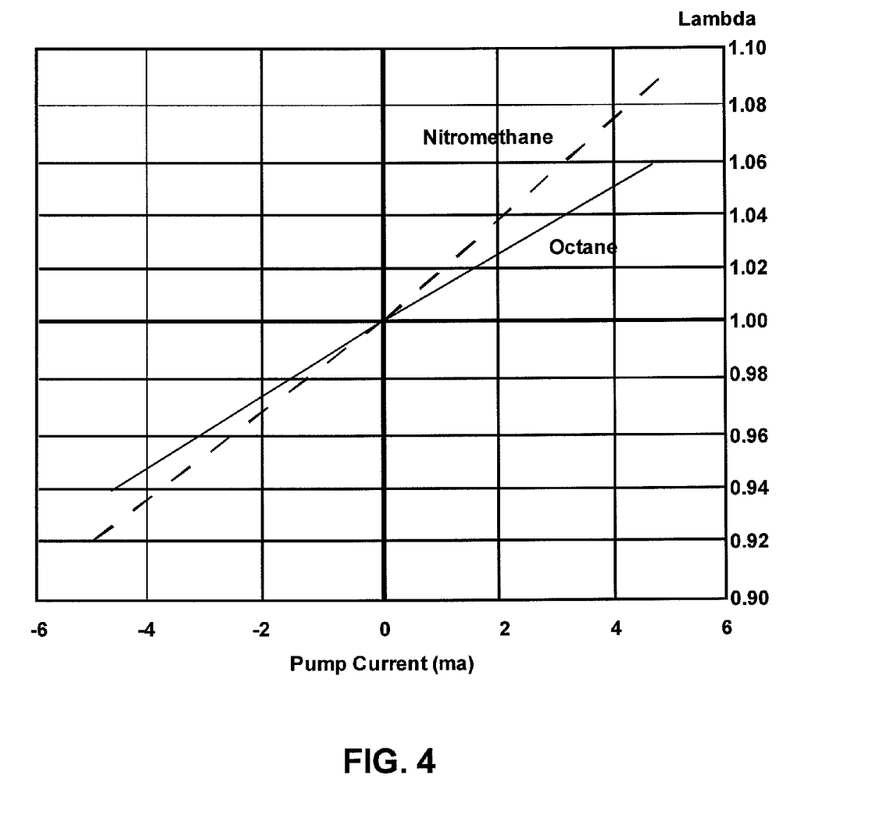
FIG. 4 is a graph illustrating lambda vs pump current for two different engine fuels according to an exemplary embodiment.

FIG. 4 is a graph illustrating lambda vs control pump current for two different engine fuels according to an exemplary embodiment. Referring to FIG. 4, curves of results of calculated lambda values from the method described herein when applied to two fuels, regular gasoline and nitromethane, are shown. As can be seen in FIG. 4, the difference in lambda values between the two fuels is significant, about 2% on the lean side and 3% at the extreme rich side. This difference is not accounted for by current aftermarket controllers, and the error translates directly into an error in the AFR and hence the fueling of the engine.

The method herein has been described in the context of a separate UEGO sensor controller configuration. In actual implementation there is no requirement for the UEGO sensor controller to be a separate controller. A combination of the ECU and the UEGO sensor controller into one unit is practical and does not limit the novel aspects of the inventive concept. Additionally, the means by which the instantaneous fuel composition is provided to the exemplary embodiments (e.g., user-input, digital, analog) does not limit the scope or application of the inventive concept.

Existing aftermarket WB Controllers which are meant for in-car use with an ECU have provision only for free air calibration, and compute an AFR value which applies only to gasoline. The systems and methods of the exemplary embodiments allow calibration, at the factory or by the end user, of the sensitivity of the UEGO sensor to $O_2$, CO, and $H_2$ gases. The molecular composition(s) of the fuel(s) being used can be input, and, with no further calibration the correct AFR will be calculated for a specific fuel or fuel mix. Calculation utilizes chemical balance relations based on hydrocarbon and measured sensor sensitivities. The molecular composition can also be provided in real time by, for example, a Flex-Fuel composition sensor which senses the proportion of mixed fuels.

Although a few embodiments of the present inventive concept have been shown and described, it should be appreciated by those skilled in the art that changes may be made to exemplary embodiments without departing from the principles and spirit of the invention. Also, the description of the exemplary embodiments of the inventive concept is intended to be illustrative, and not to limit the scope of the claims, and many alternatives, modifications, and variations will be apparent to those skilled in the art.

What is clamed is:

1. A method of determining an air-fuel ratio of an internal combustion engine in real-time, the method comprising:
   calibrating sensitivity of a universal exhaust gas oxygen sensor to a plurality of gases;
   inputting to a universal exhaust gas oxygen sensor controller a molecular composition of Hydrogen, Carbon, Oxygen, and Nitrogen which comprise a combustion fuel in use in the internal combustion engine;
   calculating with the universal exhaust gas oxygen sensor controller an air-to-fuel ratio by performing a chemical balance equation calculation based on the universal exhaust gas oxygen sensor sensitivity calibration and the input combustion fuel molecular composition; and
   transmitting the calculated air-to-fuel ratio to an engine control unit in real-time.

2. The method of claim 1, wherein the plurality of gases comprises $O_2$, CO, and $H_2$ gases.

3. The method of claim 1, wherein the calibrating sensitivity of the universal exhaust gas oxygen sensor comprises inputting calibration constants for the plurality of gases via a human interface device.

4. The method of claim 3, wherein calibration constants input for the plurality of gases resulting from calibrating the sensitivity of the universal exhaust gas oxygen sensor are stored in a memory in the universal exhaust gas oxygen sensor controller.

5. The method of claim 1, wherein the molecular composition of the combustion fuel is input to the universal exhaust gas oxygen sensor controller via a human interface device.

6. The method of claim 1, wherein the molecular composition of the combustion fuel is input to the controller as an electrical signal from a sensor.

7. The method of claim 6, wherein the sensor is one of a humidity sensor, a Flex-Fuel composition sensor, and a nitrous oxide solenoid open sensor.

8. The method of claim 6, wherein the electrical signal is a digital signal.

9. The method of claim 6, wherein the electrical signal is an analog signal.

10. The method of claim 1, wherein the combustion fuel is mixed fuel.

11. The method of claim 10, wherein the molecular composition of the combustion fuel is input in real-time by a sensor that senses proportions of mixed fuels.

12. The method of claim 11, wherein the sensor that senses proportions of mixed fuels is a Flex-Fuel composition sensor.

13. The method of claim 1, wherein the engine control unit controls one or more fuel injectors in real time based on the transmitted air-to-fuel ratio to adjust fuel delivery to the internal combustion engine to maintain the air-to-fuel ratio.

14. The method of claim 1, wherein the air-to-fuel ratio calculation is performed using a molar balance calculation.

15. A computer readable medium having embodied therein a program for causing a processor to execute a method of determining an air-fuel ratio of an internal combustion engine in real-time, the program including operations comprising:
calibrating sensitivity of a universal exhaust gas oxygen sensor to a plurality of gases;
inputting to a universal exhaust gas oxygen sensor controller a molecular composition of Hydrogen, Carbon, Oxygen, and Nitrogen which comprise a combustion fuel in use in the internal combustion engine;
calculating with the universal exhaust gas oxygen sensor controller an air-to-fuel ratio by performing a chemical balance equation calculation based on the universal exhaust gas oxygen sensor sensitivity calibration and the input combustion fuel molecular composition; and
transmitting the calculated air-to-fuel ratio to an engine control unit in real-time.

16. The computer readable medium having embodied therein a program as defined in claim 15, wherein the plurality of gases comprises $O_2$, CO, and $H_2$ gases.

17. The computer readable medium having embodied therein a program as defined in claim 15, the program further comprising storing calibration constants for the plurality of gases resulting from calibrating the sensitivity of the universal exhaust gas oxygen sensor in a memory in the universal exhaust gas oxygen sensor controller.

18. The computer readable medium having embodied therein a program as defined in claim 15, the program further comprising calculating the air-to-fuel ratio using a molar balance calculation.

19. A system for determining an air-fuel ratio of an internal combustion engine in real-time, the system comprising:
an engine control unit;
a universal exhaust gas oxygen sensor mounted in an exhaust stream; and
a universal exhaust gas oxygen sensor controller which receives a signal from the universal exhaust gas oxygen sensor and performs a chemical balance equation calculation to calculate air-to-fuel ratio in real-time based on the received signal,
wherein the universal exhaust gas oxygen sensor controller communicates the calculated air-to-fuel ratio to the engine control unit in real-time, and
the engine control unit provides real-time control of the internal combustion engine to maintain the air-to-fuel ratio communicated from the universal exhaust gas oxygen sensor controller.

20. The system of claim 19 further comprising a human interface device which inputs universal exhaust gas oxygen sensor sensitivity calibration data for a plurality of gases to the universal exhaust gas oxygen sensor controller.

21. The system of claim 20 further comprising a memory in the universal exhaust gas oxygen sensor controller in which the universal exhaust gas oxygen sensor sensitivity calibration data for the plurality of gases are stored.

22. The system of claim 19 further comprising a human interface device which inputs a molecular composition of a combustion fuel in use to the universal exhaust gas oxygen sensor controller.

23. The system of claim 22, wherein the molecular composition of the combustion fuel in use comprises the molecular composition of Hydrogen, Carbon, Oxygen, and Nitrogen of the combustion fuel.

24. The system of claim 19 further comprising a sensor which senses and inputs the molecular composition of the combustion fuel to the universal exhaust gas oxygen sensor controller as an electrical signal.

25. The system of claim 24, wherein the sensor is one of a humidity sensor, a Flex-Fuel composition sensor, and a nitrous oxide solenoid open sensor.

26. The system of claim 24 further comprising a sensor that senses and inputs the molecular composition by proportions of mixed combustion fuels to the universal exhaust gas oxygen sensor in real-time.

27. The system of claim 26, wherein the sensor that senses proportions of mixed fuels is a Flex-Fuel composition sensor.

28. The system of claim 19, wherein the engine control unit controls one or more fuel injectors in real time based on the transmitted air-to-fuel ratio to adjust fuel delivery to the internal combustion engine to maintain the air-to-fuel ratio.

29. The system of claim 19, wherein the air-to-fuel ratio calculation is performed using a molar balance calculation.

* * * * *